(12) United States Patent
Kazempoor et al.

(10) Patent No.: US 10,914,246 B2
(45) Date of Patent: Feb. 9, 2021

(54) AIR-FUEL RATIO REGULATION FOR INTERNAL COMBUSTION ENGINES

(71) Applicant: General Electric Company, Schenectady, NY (US)

(72) Inventors: Pejman Kazempoor, Edmond, OK (US); Thomas Joseph Hurley, Oklahoma City, OK (US); Nasr Eldine Alkadi, Oklahoma City, OK (US); Mark Andrew Patterson, Houston, TX (US)

(73) Assignee: General Electric Company, Schenectady, NY (US)

( * ) Notice: Subject to any disclaimer, the term of this patent is extended or adjusted under 35 U.S.C. 154(b) by 661 days.

(21) Appl. No.: 15/458,178

(22) Filed: Mar. 14, 2017

(65) Prior Publication Data

US 2018/0266342 A1    Sep. 20, 2018

(51) Int. Cl.
*F02D 41/00*  (2006.01)
*F02M 35/10*  (2006.01)
*F02D 35/00*  (2006.01)

(52) U.S. Cl.
CPC ....... *F02D 41/0007* (2013.01); *F02D 35/003* (2013.01); *F02D 41/0002* (2013.01);
(Continued)

(58) Field of Classification Search
CPC ..... F02D 2200/0802; F02D 2200/1002; F02D 2400/04; F02D 35/003; F02D 41/0002; F02D 41/0007; F02M 35/10255
See application file for complete search history.

(56) References Cited

U.S. PATENT DOCUMENTS 5,666,935 A    9/1997 Kato
5,673,676 A    10/1997 Kyoji
(Continued)

FOREIGN PATENT DOCUMENTS

CN     1969182 A     5/2007
CN     203362289 U    12/2013
(Continued)

OTHER PUBLICATIONS

Ohata et al., "Model Based Air Fuel Ratio Control for Reducing Exhaust Gas Emissions", SAE Technical Paper 950075, pp. 115-125, 1995.
(Continued)

*Primary Examiner* — Phutthiwat Wongwian
*Assistant Examiner* — Diem T Tran
(74) *Attorney, Agent, or Firm* — Benesch, Friedlander, Coplan & Aronoff LLP

(57) ABSTRACT

An air bypass system for an internal combustion engine is provided. The internal combustion engine includes an air intake system defining a first air intake chamber and a second air intake chamber coupled in flow communication with the first air intake chamber. The air bypass system includes at least one bypass assembly controlling flow communication between the first air intake chamber and the second air intake chamber, said at least one bypass assembly facilitating air flow from the second air intake chamber into the first air intake chamber during an expansion stroke of the internal combustion engine.

6 Claims, 4 Drawing Sheets

(52) U.S. Cl.
CPC ........... *F02M 35/10255* (2013.01); *F02D 2200/0802* (2013.01); *F02D 2200/1002* (2013.01); *F02D 2400/04* (2013.01)

(56) References Cited

U.S. PATENT DOCUMENTS

| | | |
|---|---|---|
| 5,694,909 A | 12/1997 | Kato |
| 5,724,951 A | 3/1998 | Mukumoto |
| 5,819,530 A | 10/1998 | Asano et al. |
| 5,918,275 A | 6/1999 | Kato et al. |
| 5,927,247 A | 7/1999 | Tanaka |
| 5,983,878 A | 11/1999 | Nonaka et al. |
| 6,019,093 A | 2/2000 | Kitagawa |
| 6,053,785 A | 4/2000 | Kato et al. |
| 6,068,530 A | 5/2000 | Ozawa |
| 6,173,698 B1 | 1/2001 | Degroot et al. |
| 6,216,663 B1 | 4/2001 | Kato et al. |
| 6,325,046 B1 | 12/2001 | Kanno |
| 6,484,688 B1 | 11/2002 | Strauss |
| 6,484,709 B1 | 11/2002 | Strauss |
| 6,491,033 B1 | 12/2002 | Motose et al. |
| 6,502,389 B2 | 1/2003 | Katayama et al. |
| 6,571,616 B1 | 6/2003 | Tsukamoto et al. |
| 6,588,205 B1 | 7/2003 | Kumagai et al. |
| 6,688,163 B2 | 2/2004 | Fujino et al. |
| 6,775,608 B2 | 8/2004 | Yasui |
| 6,976,457 B2 | 12/2005 | Klaric |
| 8,016,989 B2 | 9/2011 | Tsukahara et al. |
| 8,141,343 B2 | 3/2012 | Nagai et al. |
| 8,453,434 B2 | 6/2013 | Yacoub |
| 8,635,853 B2 | 1/2014 | Robel et al. |
| 8,935,997 B2 | 1/2015 | Foege |
| 2007/0068142 A1 | 3/2007 | Robel et al. |
| 2014/0261333 A1 | 9/2014 | Foege et al. |
| 2017/0122241 A1* | 5/2017 | Xiao ............ F02D 9/02 |

FOREIGN PATENT DOCUMENTS

| | | |
|---|---|---|
| EP | 0719913 B1 | 3/2003 |
| EP | 1339960 A2 | 9/2003 |
| EP | 0810362 B1 | 1/2004 |
| EP | 1855105 A1 | 11/2007 |
| EP | 1870700 B1 | 8/2008 |
| EP | 2037267 A3 | 7/2009 |
| GB | 1542721 A | 3/1979 |
| GB | 2213525 A | 8/1989 |
| GB | 2221065 A | 1/1990 |
| IN | 200801335 I2 | 5/2009 |
| IN | 200801557 I2 | 5/2009 |
| IN | 200803194 I4 | 6/2010 |
| IN | 201302024 P2 | 11/2013 |
| IN | 267052 B | 6/2015 |
| JP | S60230562 A | 11/1985 |
| JP | H025730 A | 1/1990 |
| JP | H02294530 A | 12/1990 |
| JP | H03117643 A | 5/1991 |
| JP | H03117644 A | 5/1991 |
| JP | H03185243 A | 8/1991 |
| JP | H08144836 A | 6/1996 |
| JP | H1037769 A | 2/1998 |
| JP | H11200913 A | 7/1999 |
| JP | 2001164972 A | 6/2001 |
| JP | 3226720 B2 | 11/2001 |
| JP | 3426018 B2 | 7/2003 |
| JP | 3437266 B2 | 8/2003 |
| JP | 2004316456 A | 11/2004 |
| JP | 2005076490 A | 3/2005 |
| JP | 3687923 B2 | 8/2005 |
| JP | 3712280 B2 | 11/2005 |
| JP | 2005307864 A | 11/2005 |
| JP | 2005330952 A | 12/2005 |
| JP | 2009058501 A | 3/2009 |
| JP | 5653618 B2 | 1/2015 |
| KR | 101136767 B1 | 4/2012 |
| KR | 101564704 B1 | 10/2015 |
| KR | 20150112848 A | 10/2015 |
| KR | 20160018502 A | 2/2016 |
| WO | 0244544 A2 | 6/2002 |
| WO | 2007057720 A1 | 5/2007 |
| WO | 2014035322 A1 | 3/2014 |

OTHER PUBLICATIONS

Alegret, G. et al., "Modeling of a Large Marine Two-Stroke Diesel Engine with Cylinder Bypass Valve and EGR System," IFAC-PapersOnLine 48, No. 16 (2015): 273-278.

* cited by examiner

AIR-FUEL RATIO REGULATION FOR INTERNAL COMBUSTION ENGINES

BACKGROUND

The field of the disclosure relates generally to internal combustion engines and, more particularly, to an air bypass system for two-stroke engines.

Many known internal combustion engines combust a combination of fuel and air to generate power in the form of torque that is used to drive other devices, e.g., fluid transfer devices, i.e., gas compressors. The ratio of air-to-fuel, (i.e., the air/fuel ratio) has an important effect on engine power and efficiency. In addition, control of the air/fuel ratio facilitates reducing the portion of combustion exhaust constituents that include NOx, CO, and unburned hydrocarbons. As such, a general control strategy is to control the air/fuel ratio by managing combustion air mass flow rate.

At least some known internal combustion engines use a two-stroke cycle. In general, two-stroke internal combustion engines include an air intake system that includes an air intake plenum coupled in flow communication with a stuffing box. The stuffing box is coupled in flow communication with a power cylinder that houses a reciprocating piston. A scavenging valve (or reed valves), that includes a plurality of one-way valves, is positioned between the air intake plenum and the stuffing box and permits air flow only from the plenum into the box. An exhaust plenum is coupled to the power cylinder and the exhaust plenum is coupled to an exhaust pipe. During the compression stroke, the piston travels away from the air intake plenum within the stuffing box, thereby pulling air into the stuffing box through the scavenging valve due to the vacuum created by the piston. Fuel is injected into a combustion chamber, and the air and fuel are combusted to initiate an expansion stroke (sometimes referred to as a "power stroke") to induce an opposite movement in the piston. During the expansion stroke, combustion gases are channeled to the exhaust pipe for removal from the combustion chamber. Also, during the expansion stroke, piston movement toward the stuffing box closes the scavenging valve and pressurizes the trapped air within the stuffing box. As such, many two-stroke engines exhibit low performance due in part to inadequate engine air/fuel ratio control. Such low performance effects include misfires and partial burns, especially at low loads, that lead to increased fuel usage and increased exhaust emissions, i.e., higher VOC and unburned hydrocarbon emissions.

BRIEF DESCRIPTION

In one aspect, an air bypass system for an internal combustion engine is provided. The internal combustion engine includes an air intake system defining a first air intake chamber and a second air intake chamber coupled in flow communication with the first air intake chamber. The air bypass system includes at least one bypass assembly controlling flow communication between the first air intake chamber and the second air intake chamber, said at least one bypass assembly facilitating air flow from the second air intake chamber into the first air intake chamber during an expansion stroke of the internal combustion engine.

In another aspect, an internal combustion engine is provided. The internal combustion engine includes a frame at least partially defining a first air intake chamber and a second air intake chamber coupled in flow communication with said first air intake chamber, an intake valve assembly coupled between, and in flow communication with, the first air intake chamber and the second air intake chamber, and an air bypass system. The air bypass system includes at least one bypass assembly controlling flow communication between the first air intake chamber and the second air intake chamber, said at least one bypass assembly facilitating air flow from the second air intake chamber into the first air intake chamber during an expansion stroke of the internal combustion engine.

In yet another aspect, a power system is provided. The power system includes at least one compressor unit, and at least one internal combustion engine coupled to said at least one compressor unit. Said at least one internal combustion engine includes a frame at least partially defining a first air intake chamber and a second air intake chamber coupled in flow communication with the first air intake chamber, an intake valve assembly coupled between, and in flow communication with, the first air intake chamber and the second air intake chamber, and an air bypass system. The air bypass system includes at least one bypass assembly controlling flow communication between the first air intake chamber and the second air intake chamber, said at least one bypass assembly facilitating air flow from the second air intake chamber into the first air intake chamber during an expansion stroke of said at least one internal combustion engine.

DRAWINGS

These and other features, aspects, and advantages of the present disclosure will become better understood when the following detailed description is read with reference to the accompanying drawings in which like characters represent like parts throughout the drawings, wherein.

Figure 1:
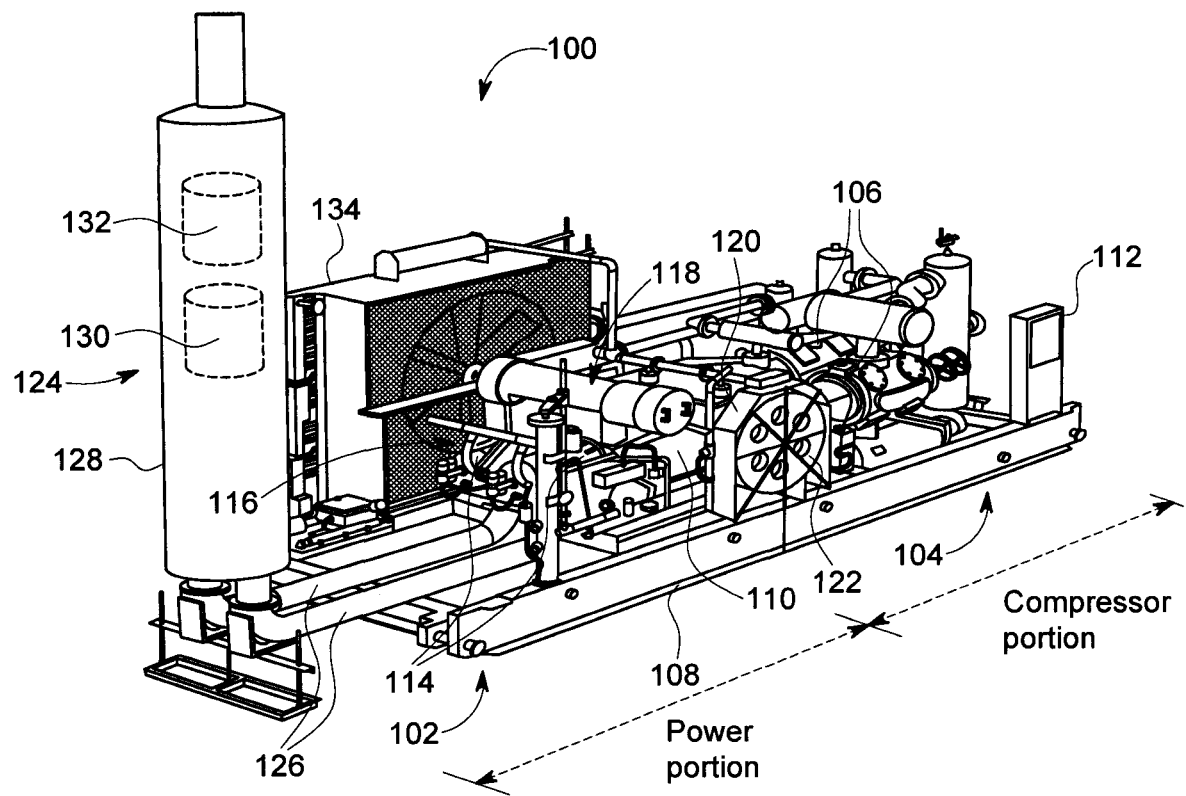
FIG. 1 is a perspective view of an exemplary power system including an exemplary internal combustion engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," "controller", and "control unit" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

The air bypass systems and internal combustion engines described herein provide improved control of the air/fuel ratio of the engine through controlling and reducing the combustion air mass flow rate into the engine. Specifically, a bypass assembly (e.g., a two-way air bypass valve) facilitates defining a flow path for air to flow back from a stuffing box into an air intake plenum during the expansion stroke, or power stroke, to reduce the combustion air mass flow rate through the stuffing box. The two-way air bypass valve is dynamically regulated (or modulated) based on the engine operating parameters to bypass (return) a portion of the trapped air in the stuffing box not required for combustion of the fuel to return to the plenum based on one or more of measured engine operating conditions. Operating the engine with a lower air/fuel ratio within the cylinder facilitates higher combustion and exhaust gas temperatures. The improved combustion conditions, especially at lower loads, facilitate a reduction in cylinder misfires and partial burns and lead to decreased fuel usage and decreased exhaust emissions. As such, improved combustion facilitates reduced unburned hydrocarbons and, specifically, regulated volatile organic compounds (VOCs), thereby facilitating an increase in the operating margin to regulatory emissions limits. Further, the catalytic converter in the exhaust system also exhibits improved performance and conversion efficiency at higher exhaust temperatures resulting from the lower air/fuel ratio. In addition, because the air temperature in the stuffing box is higher than the air temperature in the air intake plenum, air bypassed from the stuffing box increases the intake air temperature, resulting in improved combustion. Moreover, the air bypass system as described herein may be implemented in any two-stroke engines equipped with an intake valve assembly.

FIG. 1 is a perspective view of an exemplary power system 100 including an exemplary internal combustion engine 102. In the exemplary embodiment, internal combustion engine 102 is a two-cycle engine and defines the power portion of system 100. Power system 100 also includes a compression portion 104 that includes a plurality of compressors 106. Two compressors 106 are shown and in alternative embodiments, compression portion 104 includes any number of compressors, including 1 and 3 compressors 106. Power system 100 is mounted on a skid 108 and includes a frame 110. Power system 100 further includes a control unit 112 (described further below).

Frame 110 at least partially defines a plurality of power cylinders 114 (described further below). Each of power cylinders 114 is coupled in flow communication with a fuel supply system 116 and an air supply system 118. Compression portion 104 and internal combustion engine 102 are coupled to each other through a crankcase 120 that houses a crankshaft (not shown) and flywheel 122. Internal combustion engine 102 includes an exhaust system 124 that includes a plurality of exhaust pipes 126, i.e., one pipe 126 coupled to each power cylinder 114, Exhaust system 124 also includes an exhaust stack 128 that houses a catalyst system 130 and a muffler 132. Power system 100 also includes a skid cooling fan 134. Power system 100 is merely exemplary. That is, the systems and methods described herein may be implemented within any suitable power system. For example, the systems and methods described herein may be implemented in power systems including one, three, or four cylinder compressor packages.

Figure 2:
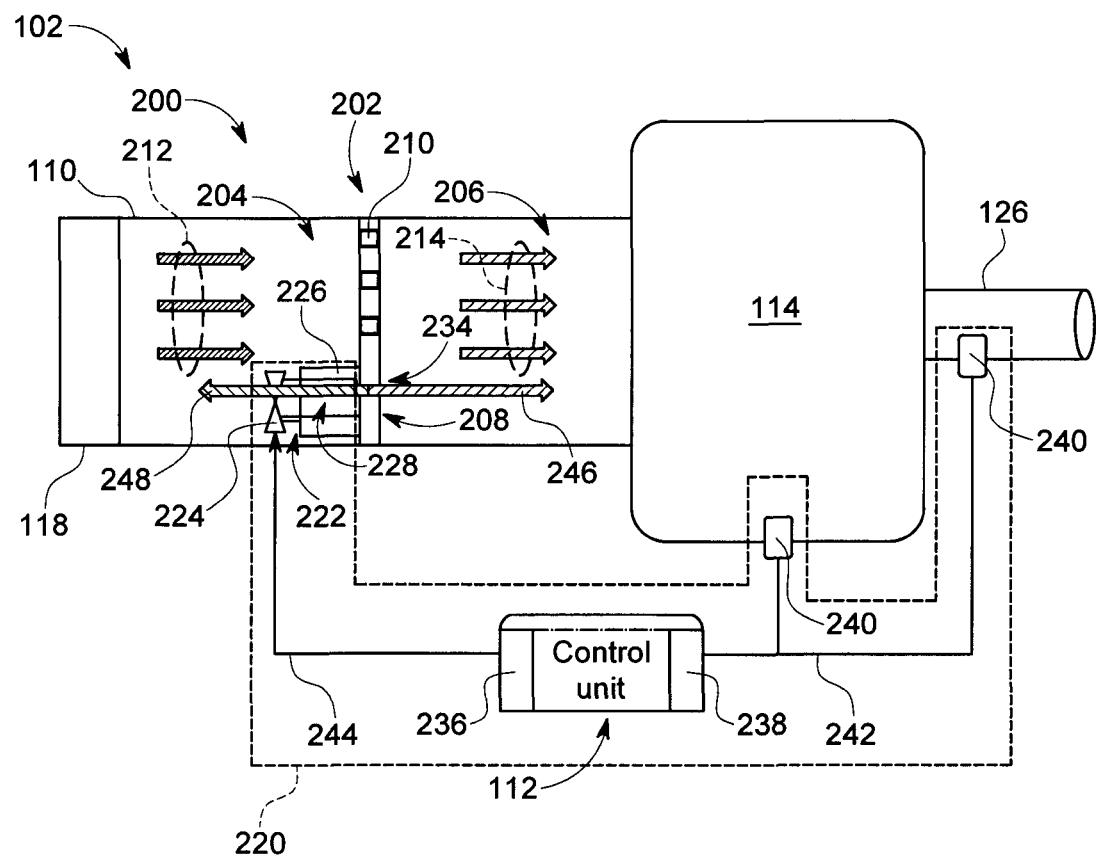
FIG. 2 is a schematic view of an exemplary combustion system for the internal combustion engine shown in FIG. 1.

FIG. 2 is a schematic view of an exemplary combustion system 200 for internal combustion engine 102. Frame 110 at least partially defines an air intake system 202 coupled in flow communication with air supply system 118. Air intake system 202 includes a first air intake chamber, i.e., an air intake plenum 204, and a second air intake chamber, i.e., a stuffing box 206. Stuffing box 206 is coupled in flow communication with air intake plenum 204 and plenum 204 is coupled in flow communication with air supply system 118. Air supply system 118 also includes an intake valve assembly 208 coupled between, and in flow communication with, air intake plenum 204 and stuffing box 206. Intake valve assembly 208, sometimes referred to as a "scavenging valve assembly" includes at least one one-way valve 210 configured to channel plenum air 212 from air intake plenum 204 to stuffing box 206, thereby pressurizing stuffing box 206 with stuffing box air 214.

Air intake system 202 also includes an air bypass system 220. Air bypass system 220 includes at least one bypass assembly 222 (one shown) coupled in flow communication with air intake plenum 204 and stuffing box 206. Bypass assembly 222 is coupled to intake valve assembly 208 through at least one of, and without limitation, fasteners, adhesives, welding, and sintering. Also, in some embodiments, bypass assembly 222 is integrally formed with intake valve assembly 208 through, for example, and without limitation, unitary casting. In the exemplary embodiment, bypass assembly 222 includes a two-way valve 224 coupled to a duct 226 that defines a two-way air passageway 228. Bypass assembly 222 is positioned proximate a channel 234 defined in intake valve assembly 208 to couple valve 224 in flow communication with stuffing box 206. Bypass assembly 222 is any assembly that facilitates operation of air bypass system 220 and internal combustion engine 102 as described herein, including, without limitation, gate valves, globe valves, ball valves, and guillotine dampers. For example, in some embodiments, bypass assembly 222 may be implemented by removing one or more of one-way valves 210 to create a hole that allows air bypass from stuffing box 206 to air intake plenum 204. In other embodiments, a hole may be drilled in intake valve assembly 208 to generate bypass assembly 222. In either situation, a valve and actuator may be used to control the flow of air through the hole. In still other embodiments, bypass assembly 222 may be implemented by partially or fully opening at least one one-way valve 208 to allow air bypass from stuffing box 206 to air intake plenum 204. The position of the at least one one-way valve 208 may be controlled (e.g., using an actuator that pushes on a plug of the valve) to manage the amount of air bypass.

In the exemplary embodiment, air bypass system 220 also includes at least one control unit 112 (one shown) operably coupled to two-way valve 224. Control unit 112 includes a processing device 238 and a memory device 236 coupled to processing device 238. In some embodiments, control unit 112 is a stand-alone controller. In other embodiments, control unit 112 is a portion of a larger control system for power system 100 (shown in FIG. 1) or internal combustion engine 102. Air bypass system 220 further includes at least one sensing device 240 (two shown) coupled to memory device 236. Sensing device 240 is one or more of, for example, and without limitation, an engine load sensor, an engine pressure sensor, an engine exhaust temperature sensor, and an engine exhaust constituent sensor. In some embodiments, air bypass system 220 does not include a controller.

Control unit 112 is configured to regulate two-way valve 224 to at least partially open during a compression stroke of internal combustion engine 102. More specifically, control unit 112 receives input signals 242 from sensing devices 240, calculates a valve position command, and transmits output signals 244 representative of such valve position command. In general, valve 224 will be commanded to at least partially close during the compression stroke to facilitate air ingress into power cylinder 114 during higher loads. During lower loads, one-way valves 210 may provide sufficient air for combustion and valve 224 is commanded to at least partially open from any closed position. During certain operational modes of engine 102, valve 224 will be regulated through modulation thereof to regulate bypass air flow 248 from stuffing box 206 into air intake plenum 204 into stuffing box 206 through channel 234 as a function of input signals 242 from sensing devices 240 into control unit 112 and output signals 244 from control unit 112 to valve 224 based on operating parameters of engine 102 as programmed into control unit 112, such regulation ranging from substantially fully closed to substantially fully open. That is, air may be regulated to meet desired air/fuel ratio targets and emissions targets. For example, under some conditions, during the expansion stroke of internal combustion engine 102, valve 224 is commanded to at least partially open based on operating parameters of engine 102 as programmed into control unit 112 to bypass (return) a portion of the trapped air in stuffing box 206, i.e., bypass air flow 248 back into air intake plenum 204 through channel 234.

Figure 3:
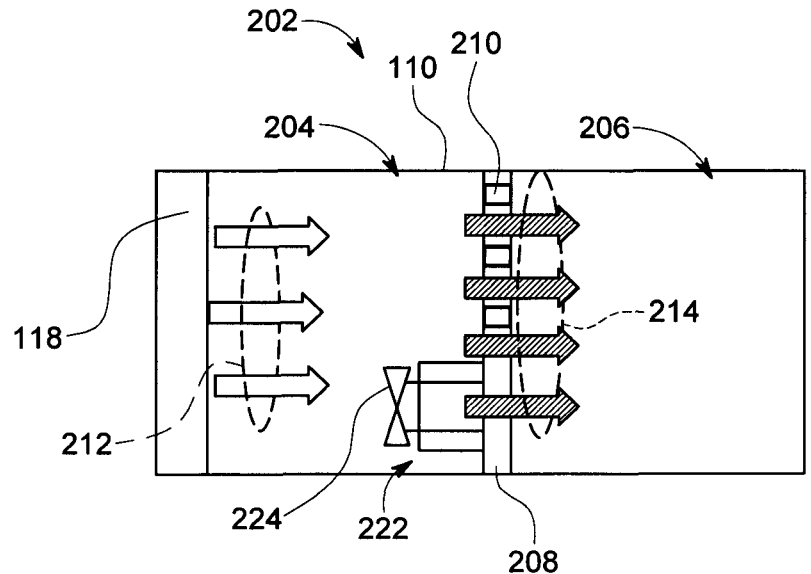
FIG. 3 is a schematic view of a portion of the combustion system shown in FIG. 2 during a compression stroke of the internal combustion engine shown in FIG. 1.
Figure 4:
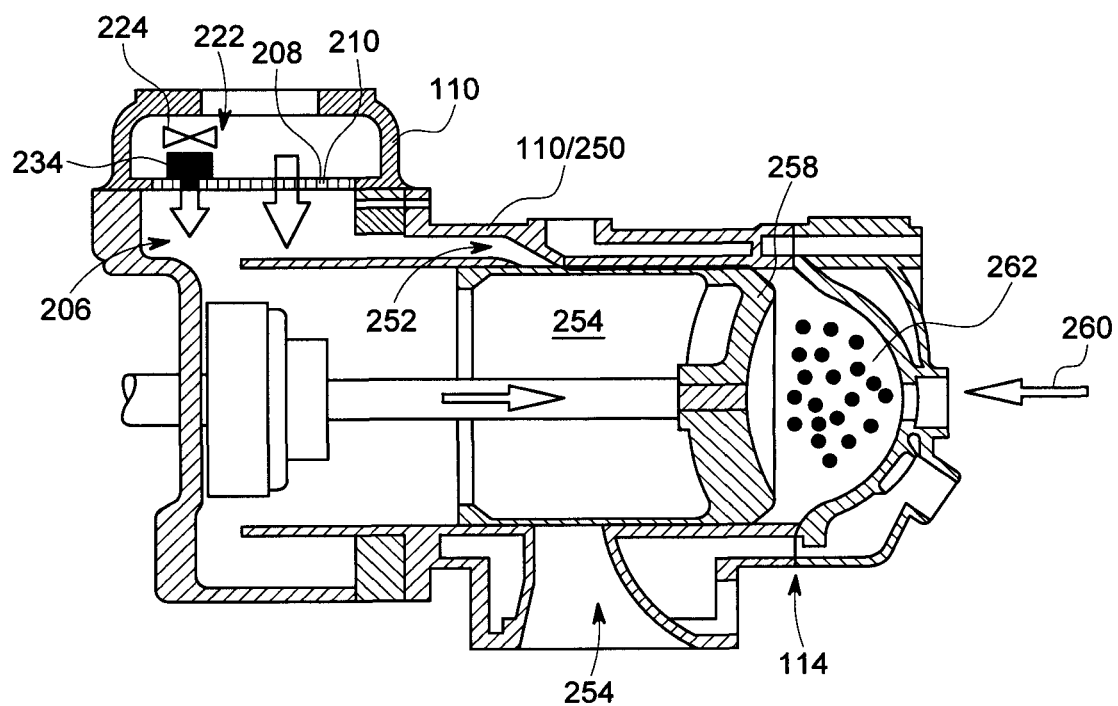
FIG. 4 is a cutaway view of a cylinder of the internal combustion engine shown in FIG. 1 in the compression stroke.

FIG. 3 is a schematic view of a portion of combustion system 200 (shown in FIG. 2), i.e., air intake system 202 during a compression stroke of internal combustion engine 102 (shown in FIG. 1). FIG. 4 is a cutaway view of power cylinder 114 of internal combustion engine 102 (shown in FIG. 1) in the compression stroke. A portion of frame 110 is used to form a wall 250 of power cylinder 114. Power cylinder wall 250 defines an air channel 252 therein and power cylinder wall 250 also defines a power cylinder bore 254. Power cylinder bore 254 is coupled in flow communication with stuffing box 206 and fuel supply system 116 (shown in FIG. 1) and power cylinder bore 254 is coupled in flow communication with air channel 252. Power cylinder 114 also includes an exhaust section 256 coupled to exhaust system 124 (shown in FIG. 1). Also, power cylinder 114 includes a piston 258 disposed within power cylinder bore 254, where piston 258 is configured for reciprocal motion within power cylinder bore 254, the reciprocal motion including a compression stroke and an expansion stroke (shown in FIGS. 5 and 6, and discussed further below).

Referring to FIGS. 3 and 4, during the compression stroke, each one-way valve 210 of intake valve assembly 208 opens due to the vacuum created by piston 258 as it transits away from stuffing box 206. Air 212 flows from air supply system 118 into air intake plenum 204. Air 214 flows from intake plenum 204 through one-way valves 210 (and, optionally, through bypass assembly 222) into stuffing box 206, thereby pressurizing stuffing box 206 with air. In addition, in general, valve 224 will be commanded to at least partially open during the compression stroke to facilitate air ingress into power cylinder 114. Under some conditions (e.g., at lower loads), one-way valves 210 may provide sufficient air for combustion and valve 224 is commanded to at least partially close from any open position. During certain operational modes of engine 102, valve 224 will be regulated through modulation thereof to regulate air flow from air intake plenum 204 into stuffing box 206 through channel 234 as a function of operating parameters of engine 102 as programmed into control unit 112 (shown on FIG. 2), such regulation ranging from substantially fully closed to substantially fully open. Fuel 260 from fuel supply system 116 is injected into power cylinder bore 254 where fuel 260 and air ignite and combust to form combustion products 262

Figure 5:
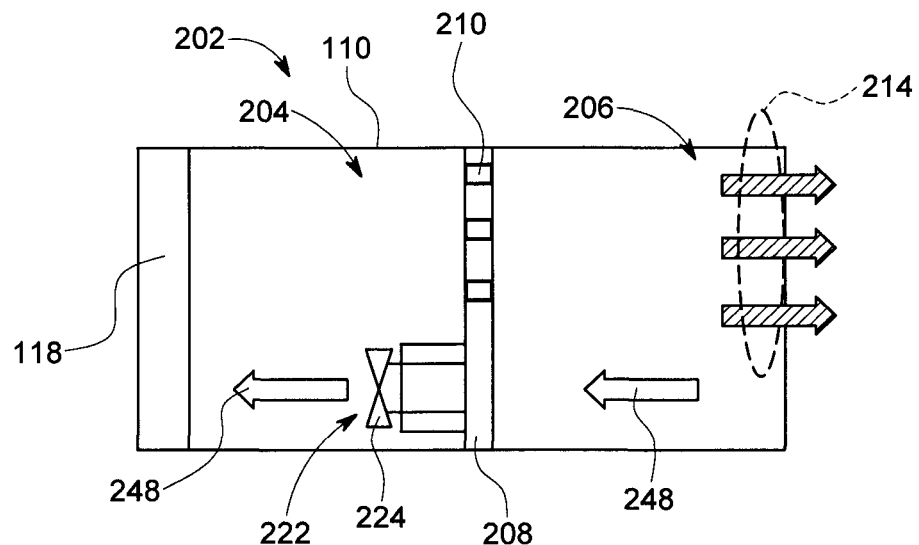
FIG. 5 is a schematic view of the portion of the combustion system shown in FIG. 3 during an expansion stroke of the internal combustion engine shown in FIG. 1.
Figure 6:
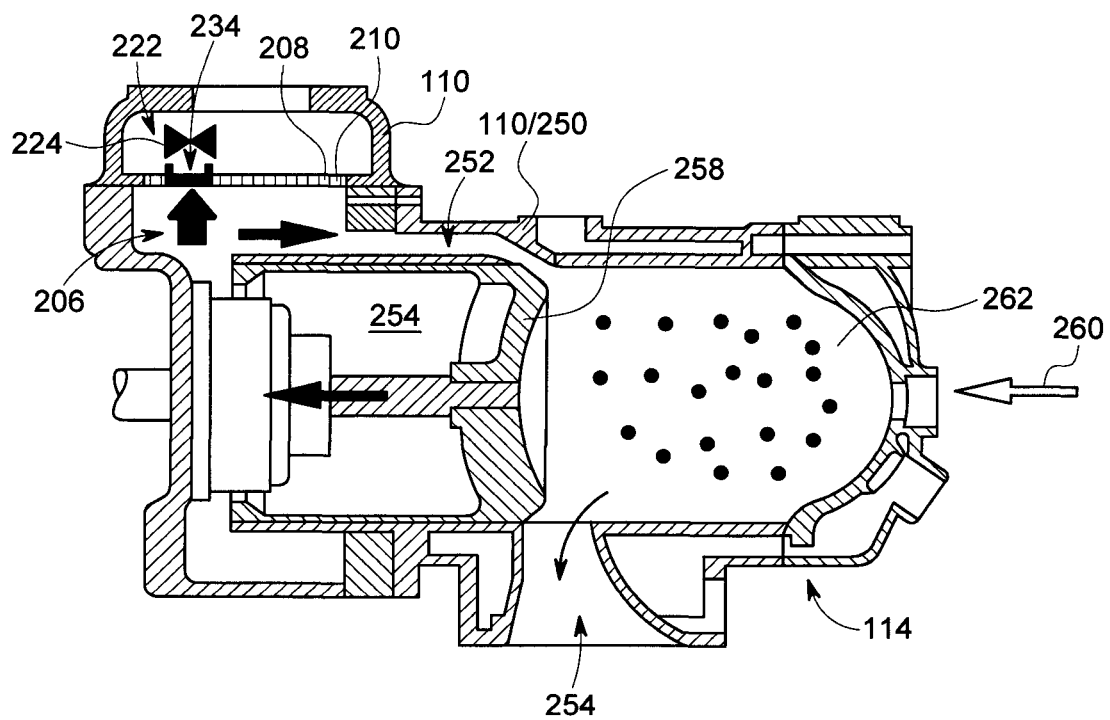
FIG. 6 is a cutaway view of the cylinder of the internal combustion engine shown in FIG. 4 in the expansion stroke.

FIG. 5 is a schematic view of the portion of combustion system 200 (shown in FIG. 2), i.e., air intake system 202 during an expansion stroke of internal combustion engine 102 (shown in FIG. 1). FIG. 6 is a cutaway view of power cylinder 114 of internal combustion engine 102 (shown in FIG. 1) in the expansion stroke. During the expansion stroke, each one-way valve 210 of intake valve assembly 208 closes due to the pressure in stuffing box 206 created by piston 258 as it transits towards stuffing box 206. Also, as piston 258 transits towards stuffing box 206, some of the air in stuffing box 206 is channeled into power cylinder bore 254 through air channel 252, which facilitates pushing combustion products 262 through exhaust section 256 into exhaust system 124.

Also, in general, during the expansion stroke of internal combustion engine 102, valve 224 is commanded to at least partially open based on operating parameters of engine 102 as programmed into control unit 112 to bypass (return) a portion of the trapped air in stuffing box 206, i.e., bypass air flow 248, back into air intake plenum 204 through channel 234. Under some conditions (e.g., at higher loads), valve 224 will be regulated through modulation thereof to regulate air flow 246 from air intake plenum 204 into stuffing box 206, or the reverse flow thereof, through channel 234 based on operating parameters of engine 102 as programmed into control unit 112, such regulation ranging from substantially fully closed to substantially fully open.

The above-described air bypass system improves control of the air/fuel ratio of the engine through controlling and reducing the combustion air mass flow rate into the engine. Specifically, a bypass assembly (e.g., a two-way air bypass valve) facilitates defining a flow path for air to flow back to from a stuffing box into an air intake plenum during the expansion stroke to reduce the combustion air mass flow rate through the stuffing box. The bypass assembly may be regulated based on the engine operating parameters to bypass (return) a portion of the trapped air in the stuffing box not required for lean combustion of the fuel to return to the plenum based on one or more of measured engine operating conditions. Operating the engine with a lower air/fuel ratio within the cylinder facilitates higher combustion and exhaust gas temperatures. The improved combustion conditions, especially at lower loads, facilitate a reduction in cylinder misfires and partial burns, and in turn leads to decreased fuel usage and decreased exhaust emissions. As such, improved combustion facilitates reduced unburned hydrocarbons and volatile organic compounds (VOCs), thereby facilitating an increase in the operating margin to regulatory emissions limits. Further, the catalytic converter in the exhaust system also exhibits improved performance and conversion efficiency at higher exhaust temperatures. In addition, because the air temperature in the stuffing box is higher than the air temperature in the air intake plenum, air bypassed from the stuffing box increases the intake air temperature, resulting in improved combustion. Moreover, the air bypass system as described herein may be implemented in two-stroke engines equipped with an intake valve assembly.

An exemplary technical effect of the methods, systems, and apparatus described herein includes at least one of: (a) improving regulation of the air/fuel ratio in a two-stroke internal combustion engine; (b) defining a flow path for air to flow back to from a stuffing box into an air intake plenum during the expansion stroke of the engine to reduce the combustion air mass flow rate through the stuffing box; (c) improving combustion conditions, especially at lower loads, thereby facilitating a reduction in cylinder misfires and partial burns, and, as such, reducing the opportunities for generating conditions that lead to increased fuel usage and increased exhaust emissions; (d) reducing the concentrations of unburned hydrocarbons and volatile organic compounds (VOCs) in the engine exhaust, thereby facilitating an increase in the operating margin to regulatory emissions limits; (e) facilitating an improvement of performance and conversion efficiency of the catalytic converter in the exhaust system due to the higher exhaust temperatures; (f) implementing the air bypass system as a retrofit kit in any two-stroke engines equipped with an intake valve assembly; and (g) increasing the temperature of intake air.

Exemplary embodiments of an air bypass system are described above in detail. The air bypass system is not limited to the specific embodiments described herein, but rather, components of systems and/or steps of the methods may be utilized independently and separately from other components and/or steps described herein. For example, the methods may also be used in combination with other systems which require an air bypass system, and are not limited to practice with only the systems and methods as described herein. Rather, the exemplary embodiment may be implemented and utilized in connection with many other machinery applications that require air bypass systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus for use in an internal combustion engine having a piston supported in a bore for reciprocal motion including a compression stroke and an expansion stroke, the apparatus comprising:

an air intake system configured to deliver air to the bore in the cylinder, including a first air intake chamber, a second air intake chamber between the first air intake chamber and the bore, and a one-way valve operative between the first and second air intake chambers, wherein the one way valve permits air to flow through the one way valve only in a direction from the first air intake chamber to the second air intake chamber;

wherein the air intake system further includes a bypass assembly including a two way valve which, in a closed condition, blocks air flow between the first air intake chamber and the second air intake chamber through the two way valve and, in an open condition, permits air flow between the first air intake chamber and the second air intake chamber through the two way valve.

2. An apparatus as defined in claim 1, wherein the one way valve is configured to open under the influence of vacuum pressure in the bore during the compression stroke of the piston, and to close under the influence of elevated pressure in the bore during the expansion stroke of the piston.

3. An apparatus as defined in claim 2, wherein the one way valve is one of a plurality of one way valves between the first air intake chamber and the second air intake chamber, and each of the one way valves is configured to open under the influence of vacuum pressure in the bore during the compression stroke of the piston, and to close under the influence of elevated pressure in the bore during the expansion stroke of the piston.

4. An apparatus as defined in claim 2, further comprising a control system configured to regulate the open condition of the two way valve during both the compression stroke of the piston and the expansion stroke of the piston.

5. An apparatus as defined in claim 4, wherein the control system is configured to sense an engine operating condition, and to regulate the open condition of the two way valve in response the sensed engine operating condition.

6. An apparatus as defined in claim 1, wherein the bore and the second air intake chamber are contained within a common power cylinder wall, with the second air intake chamber in open communication with the bore.

* * * * *